United States Patent [19]

Corbo et al.

[11] 4,147,570
[45] Apr. 3, 1979

[54] METHOD OF MAKING TEXTILE ELEMENT

[75] Inventors: Kenneth P. Corbo; Richard W. Shepard, both of Torrington; William A. Ross, New Hartford; Albert S. Ashmead, Torrington, all of Conn.

[73] Assignee: The Torrington Company, Torrington, Conn.

[21] Appl. No.: 793,783

[22] Filed: May 5, 1977

Related U.S. Application Data

[62] Division of Ser. No. 727,446, Sep. 28, 1976, abandoned.

[51] Int. Cl.² .............................................. C21D 1/06
[52] U.S. Cl. ..................................... 148/144; 148/39; 148/145; 148/146; 148/152; 219/121 LM
[58] Field of Search ............... 148/143, 144, 145, 146, 148/152, 39; 219/121 LM

[56] References Cited

U.S. PATENT DOCUMENTS 3,466,202  9/1969  Hrusovsky ............................ 148/152

Primary Examiner—R. Dean

Attorney, Agent, or Firm—Frank S. Troidl

[57] ABSTRACT

A hardened wear spot on a textile element is formed by applying high energy heat to a selected small area of the element which has been previously hardened and tempered to provide the proper spring characteristics for an operating textile element. The intensity and time of application of the high energy heat and the cooling after heat cut-off are carefully controlled to provide a small area of full hardness which is completely separated from the remaining tempered portion by a buffer zone of less hardness than either the tempered portion or the full hardness area.

The new textile element made by this new method is a textile element with the major portion having a predetermined spring characteristic for an operating textile element. A small area of full hardness is located at a predetermined location to provide wear resistance. A buffer zone having less hardness than either the full hardness area or the major tempered portion completely separates the full hardness area from the major portion.

3 Claims, 5 Drawing Figures

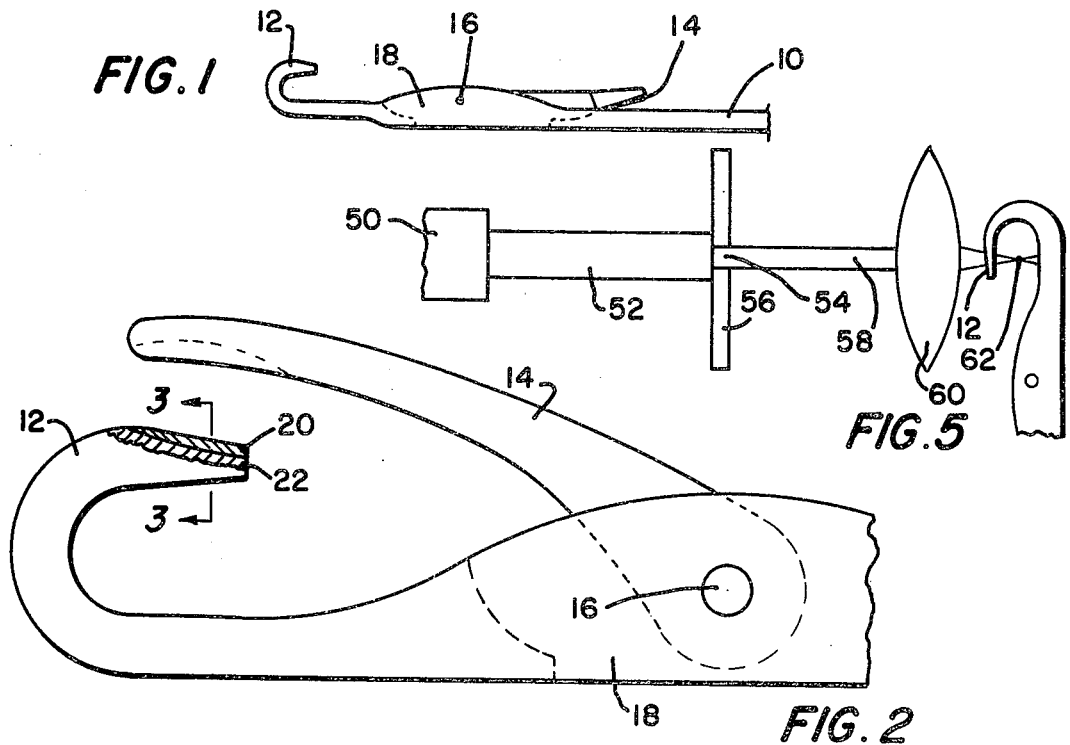
FIG. 1
FIG. 5
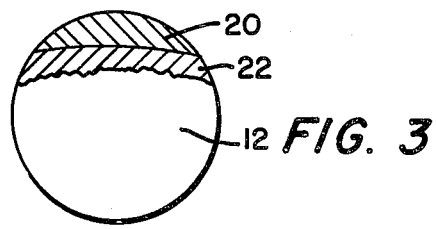
FIG. 2
FIG. 3
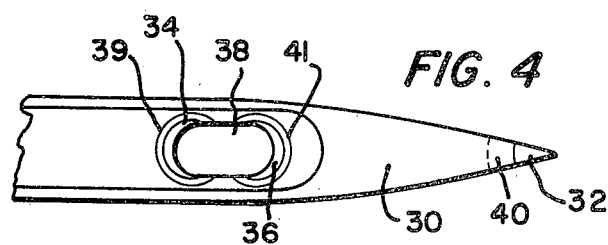
FIG. 4

METHOD OF MAKING TEXTILE ELEMENT

This is a division of application Ser. No. 727,446 filed Sept. 28, 1976, abandoned.

This invention relates to textile elements. More particularly, this invention is a new textile element and a new method for making a textile element.

In the general usage of textile machine elements, it oftens happens that one or two spots on each element receive more wear than the remainder of the element. Examples are the points and eyes of sewing machine needles, the hooks of machine knitting needles, the barbs of felting needles, the points of awls, and the ends of punches.

Good textile element making practice requires that the hardness of a properly heat-treated element should be as great as the application of the part will allow. The textile element must have the utmost wear resistance while remaining spring-like enough to resist breakage. The metal used to make textile elements, such as steel, provides the best wear resistance when it is fully hardened. Unfortunately, these textile parts are always load-carrying elements, and therefore must act somewhat like springs capable of being continuously and repetitiously stressed without failing. Unfortunately, when the material is fully hardened, it is the most breakable. Such full hard parts are brittle, and except for a few rare applications, will not function long as textile elements. Excessive hardness can cause cracks during usage with eventual fatigue failures or even immediate breakage, particularly at any sharp surface discontinuity. In current textile element making methods, in order to provide a less breakable machine element than a fully hardened element, the element is tempered after it has been fully hardened; that is, after hardening the part is heated again, but to a lower temperature than in hardening, and cooled more slowly. The element loses some of its hardness and becomes more of a hard spring. However, though a tempered metal is less breakable than a hardened metal, it unfortunately has poorer wear resistance. Thus, a compromise is always arrived at in currently practiced needle making methods. As much hardness as possible is provided without the danger of breakage. An example is a steel capable of obtaining a full hardness of 68 Rockwell C. While the 68 Rockwell C is its best wear resistance hardness, 61 Rockwell C would be about as hard as the spring characteristics would allow, and 56 to 58 would be better. The parts are too small to allow inserts of a harder material to be used, such as carbide inserts on the wear surfaces of drills and cutters. The parts are too small to be case hardened; and the proper material for case hardening would not give the proper spring characteristics for a textile element. Chrome plate is used extensively but is thin, difficult to control, and of limited wear resistance.

The areas of the textile elements which require the most wear resistance are often small and clearly defined. Examples are the hook of a pile fabric machine knitting needle or the eye of a sewing machine needle. This invention is a new textile element which includes a localized area of fully hardened material at a predetermined location to provide good wear resistance, with the major portion of the textile element having the proper spring characteristics for a good textile element, these two portions of the element being separated by a buffer zone having less hardness than either the full hardness area or the spring tempered major portion.

The softer buffer zone is necessary to relieve the stresses and reduce the danger of cracking which occur when there is an abrupt transition from the full hard zone to the tempered major body portion without a measurable lower-hardness zone in between.

This invention is also a new method for making a hardened and tempered textile element which has localized small areas of full hardened material to provide the greatest wear resistance.

Briefly described, this new method of making a textile element comprises applying high energy heat such as by a laser beam to a selected portion of a member which has previously been hardened and tempered to provide the proper spring characteristic for a textile element. The intensity and time of application of the high energy heat and the area to which it is applied are carefully controlled to provide a small area of full hardness completely separated from the tempered portion by a buffer zone of less hardness than either the tempered portion or the full hardness area.

The invention as well as its many advantages will be further understood by reference to the following detailed description and drawings in which:

FIG. 1 is a side elevational view showing a portion of a typical latch needle;

FIG. 2 is a side elevational view, on an enlarged scale, showing the new needle formed as a result of applying the new method to a typical latch needle such as shown in FIG. 1;

FIG. 3 is an enlarged sectional view taken along lines 3—3 of FIG. 2;

FIG. 4 illustrates the eye and pointed end of a typical sewing machine needle made by this new method; and FIG. 5 is a schematic representation of the application of a laser beam against the hook of a latch needle in accordance with this invention.

In the various figures, like parts are referred to by like numbers.

Referring to the drawings, and more particularly to FIG. 1, the latch needle includes a blade 10 with a hook 12 on the end of the blade. The latch 14 pivots about pivot 16 which extends transversely across a slot 18 indicated by broken lines. Each time the latch closes, at each knitting stroke, the latch strikes the hook 12.

Referring to FIG. 2 and FIG. 3, the new latch needle includes a small area 20 of full hardness which is located at a predetermined location to provide wear resistance. In the embodiment shown in FIG. 2 and FIG. 3, the location of the small area of full hardness is on the top of the hook 12 which is continuously struck by the latch 14. Typically, the full hardness area 20 may have a Rockwell hardness in the range from 66 to 68 $R_c$. Steels used in textile elements will fully harden into the range of 62 to 70 $R_c$. Each steel composition has its own definite full hardness figure. We mention a hardness range only to include the full hardness values for various steels and not to indicate that any one steel may have a variety of such values.

A buffer zone 22 completely separates the area of full hardness 20 from the major portion of the latch needle. The buffer zone is less hard than either the full hardness area 20 or the major portion of the latch needle. Thus there is a relatively soft area next to the hard spot 20 with the hardness of the buffer zone increasing as you travel away from the hard spot 20 toward the originally hardened and tempered major portion of the latch needle. For example, the needle may include a hard spot with hardness in the range from 66 to 68 $R_c$, the hardness dropping fairly abruptly in the buffer area 22 to possibly 48 to 50 $R_c$ adjacent to the hard spot and gradually rising to the original approximately 56 to 58 $R_c$ in the major area.

In FIG. 4, the new textile element made in accordance with this invention is a sewing machine needle having a major portion 30 with a fully hardened zone at its tip 32, and fully hardened zones 34 and 36 adjacent the eye 38 of the sewing machine needle. The tip of the needle 32 of full hardness is completely separated from the major portion 30 of the sewing machine needle by the buffer zone 40. The major portion of the needle 30 is also separated from the fully hardened zones 34 and 36 by buffer zones 39 and 41, respectively. Typically, the full hardened areas may have a Rockwell hardness of approximately 68 $R_c$ with the buffer zones having a minimum hardness of approximately 45 $R_c$ immediately adjacent the hardened areas and with the buffer zone hardness gradually increasing to the Rockwell hardness of approximately 60 $R_c$ of the major portion at the boundaries of the buffer zones with the major portion 30.

In practicing this new method of making a textile element such as the latch needle shown in FIG. 2 and FIG. 3, or the sewing machine needle of FIG. 4, high energy heat is applied to the selected portion of the member for a very short period of time, and then cut off, and the spot cools. The latch needle has been previously hardened and tempered to provide the proper spring characteristic for a latch needle. This new method provides a new textile element which provides fully hardened wear spots on the tempered needles to increase the wear life while not decreasing the fatigue life.

High energy heat such as from a laser light beam is applied to the hook 12 of a latch needle which has been previously hardened and tempered to provide the proper spring characteristic. When the laser is cut off after only a few milliseconds of time when the spot temperature has been raised above the critical temperature for hardening the heated area cools. The spot becomes full hard, while the very adjacent area is overtempered or possibly even annealed to produce a much softer buffer zone which increases in hardness away from the hard spot up to the tempered hardness of the major portion of the needle. The intensity and time of application of the laser beam, and the area of application on the textile element must be very carefully controlled. For example, with a typical latch needle made of steel, to reharden the desired spot 20, we heat the spot to a minimum of 1330° F., with 1500° to 1600° F. being optimum. From that temperature we must cool past 1000° F. in less than one second to retain the hard spot and not temper it, as can be seen from the Time-Temperature-Transformation curves for steel. If the spot is heated too rapidly, on a needle which is at room temperature, there is a very abrupt steep temperature gradient from the heated spot temperature to the relatively cold temperature of the needle body. With this temperature gradient, when the laser is cut off the heat transfers into the body 12 so fast that the buffer zone 22 is much too narrow to be measurable with present metallurgical instruments and so is not really a buffer zone at all, and the resulting latch needle will crack and break quickly in use.

To obtain the desired serviceable buffer zone 22, it is desirable to heat the buffer zone to a less-abrupt predetermined temperature gradient to produce higher temperatures in the buffer area, and to reduce the cooling speed or the rate of heat transfer from the buffer zone 22. The longer time it takes to cool from the predetermined temperature, the softer will be the buffer zone. The thicker the heated buffer area, the thicker will be the resulting buffer zone. Therefore, we may deliberately control the intensity and time of application of the laser beam, so that the time of application may be longer than required merely for a rapid heating to form the hard area 20. The time of heating is increased, but is still measured in milliseconds, and the temperature of the buffer zone 22 goes higher than with more rapid heating because there is more time for heat flow to that buffer area from the hot spot 20. The temperature gradient in the buffer zone 22 from the hot spot 20 to the tempered body area 12 will be less steep. Thus, when the laser is cut off it takes slightly longer for the temperature to reduce down to the temperature of the needle body. The temperature of the spot 20 must still be reduced down past 1000° F. in less than one second to make it harden fully, but the temperature in the area next to it, because of the relatively flatter temperature gradient and the thicker buffer zone will not reduce as quickly as when there had been an extremely thin buffer area due to the fast spot heating. That area of the needle which has had the highest temperatures beneath the temperatures at which the needle will harden will end up the softest and thus a relatively soft area or buffer zone 22, next to the hard spot 20, is provided, with the hardness within the buffer zone 22 increasing as you travel from the hard spot 20 toward the originally hardened and tempered body area 12. Thus we will have our hard spot around 66 to 68 Rockwell C; the hardness dropping fairly abruptly in the buffer zone 22 to possibly 48 to 50 Rockwell C and gradually rising to the original approximately 56 to 58 Rockwell C in the body area 12. If the width of the heated buffer area is too small and the rate of cooling in this process is still too fast for our desired buffer zone 22 when the needle spot is heated from room temperature, then we can initially raise the needle body temperature before laser-heating the spot. This will extend the time it takes after turning off the laser to reduce the temperature of our desired buffer zone 22, resulting in the desired wider less hard zone. The hardened spot having been heated up to a hardening temperature, will still come out hard so long as we reduce this temperature down to 1000° F. in less than one second.

Of course, the exact time allowable for heating and for cooling, the exact heating temperature, and the intensity required will actually depend upon the alloy of the needle material and the exact end results desired on any particular textile element. The hard spots typically may be in the range of 0.002 inch to 0.015 inch thick, and the buffer zone typically may have a thickness in the range from one quarter the thickness of the hard spot to a thickness equal to that of the hard spot. On the hook wear area of a machine knitting needle with a hook wire diameter of 0.012 inch, typically the thickest part of the hard zone 20 may be approximately 0.004 inches; and the buffer zone 22 between the hard spot 20 and the previously tempered needle body 12 may be approximately 0.003 inch thick.

FIG. 5 is a schematic representation showing a laser beam system for practicing this new method. Referring to FIG. 5 the laser 50 emits a laser beam 52. The laser beam 52 may be too large because of the small size of the textile element. Thus the beam is next run through a particularly shaped aperture or hole 54 in a metal plate or mask or shield such as a polished brass plate 56. The reduced beam 58 does not have enough concentration to reach the temperatures required. Thus, the reduced beam 58 is conducted through a lens 60 to concentrate the beam on the area to be heated. The excess light which strikes the plate 56 is reflected back and preferably scattered by having a non-flat surface on plate 56 so as not to damage the laser equipment.

As discussed above, this new method requires an extremely accurate control of temperatures. Either just before or just after the focal point 62, the concentration of light energy, and thus heat energy, is not as intense as it is at the focal point. We have found that we can partially control temperature by varying the distance of the workpiece 12 from the focal point 62. Other controls consist of varying the laser output, varying the time length of energy application, changing the light concentration lens, varying the size and shape of the aperture in the light mask or sheild. The shape of the aperture also gives us good control over the area of heating and lets us prevent heating of other areas which should remain relatively cool.

Sometimes it is desirable not to have the hard spot at its maximum possible hardness but to have it tempered to a lesser hardness which is still harder than the spring tempered hardness of the major portion of the textile element, while still maintaining the overtempered softer buffer zone between the hard spot and the major portion. In this case, after the element has been hardened and tempered, and after the fully hardened area and the softer buffer zone have been formed, the full hard spot is tempered to a lesser hardness which is still harder than the major portion. The heating for this tempering may be accomplished by spot heating in a manner similar to heating for the spot hardening only to a much lesser extent, or by localized heating as by induction heating, or by heating the entire element, or by an other desired heating method, and then cooling. This tempering temperature is too low to change the hardness of any of the already tempered sections of the element.

While we have referred specifically to machine needles in discussing textile elements, the process and products are not limited to needles. Other textile items, such as for example, jacks, sinkers, dividers, awls, sliders, hooks, guides, and punches, also must be included in this general category.

We claim:

1. A method of making a textile element comprising: applying a laser beam to a selected portion of a member which has been hardened and tempered to provide the proper spring characteristic for a textile element to provide long fatigue life, the intensity and time and area of application of the laser beam being carefully controlled to provide a small area of full hardness harder than and completely separated from the hardened and tempered major portion by a stress-relieving buffer zone of less hardness than either the tempered major portion or the full hardness area.

2. The method of claim 1 wherein the full hardness area has a hardness in the range from 62–70 $R_c$, the buffer zone hardness ranges down to 45 $R_c$ next to the full hardness area and increases with distance away from the full hardness zone and the hardness of the hardened and tempered portion is in the range from 50–62 $R_c$.

3. A method of making a textile element comprising: applying a laser beam to a selected portion of a member which has been hardened and tempered to provide the proper spring characteristic for a textile element to provide long fatigue life, the intensity and time and area of application of the laser beam being carefully controlled to provide a small area of full hardness harder than and completely separated from the hardened and tempered major portion by a stress-relieving buffer zone of less hardness than either the tempered major portion or the full hardness area; the tempering the small area of full hardness to a lesser hardness which is still harder than the major portion.

* * * * *